(12) United States Patent
Harter et al.

(10) Patent No.: US 7,165,075 B2
(45) Date of Patent: Jan. 16, 2007

(54) OBJECT GRAPH FAULTING AND TRIMMING IN AN OBJECT-RELATIONAL DATABASE SYSTEM

(75) Inventors: Steven Virgil Harter, Fargo, ND (US); Steven P. Anonsen, Fargo, ND (US)

(73) Assignee: Microsoft Corporation, Redmond, WA (US)

( * ) Notice: Subject to any disclaimer, the term of this patent is extended or adjusted under 35 U.S.C. 154(b) by 528 days.

(21) Appl. No.: 10/199,956

(22) Filed: Jul. 20, 2002

(65) Prior Publication Data

US 2004/0015516 A1 Jan. 22, 2004

(51) Int. Cl.
*G06F 17/00* (2006.01)
*G06F 7/00* (2006.01)

(52) U.S. Cl. .................. 707/103 R; 707/3; 707/104.1
(58) Field of Classification Search ................ 707/1–4, 707/8–10, 100–103 R, 104.1, 104; 709/200, 709/201, 203, 217–219; 705/26, 27; 717/114, 717/137, 162–163
See application file for complete search history.

(56) References Cited

U.S. PATENT DOCUMENTS

| | | | | |
|---|---|---|---|---|
| 5,295,256 A | * | 3/1994 | Bapat ......................... | 717/137 |
| 5,615,362 A | * | 3/1997 | Jensen et al. ............ | 707/103 R |
| 5,630,127 A | * | 5/1997 | Moore et al. ............ | 707/103 R |
| 5,708,811 A | * | 1/1998 | Arendt et al. ................ | 717/163 |
| 5,765,159 A | * | 6/1998 | Srinivasan ................... | 707/102 |
| 5,873,093 A | | 2/1999 | Williamson et al. ........ | 707/103 |
| 5,893,108 A | * | 4/1999 | Srinivasan et al. ...... | 707/103 R |
| 5,897,634 A | * | 4/1999 | Attaluri et al. ................ | 707/8 |
| 5,925,100 A | * | 7/1999 | Drewry et al. ............... | 709/219 |
| 6,122,641 A | | 9/2000 | Williamson et al. ........ | 707/103 |
| 6,205,580 B1 | * | 3/2001 | Hirose ......................... | 717/162 |
| 6,240,550 B1 | * | 5/2001 | Nathan et al. ............... | 717/169 |
| 6,374,252 B1 | * | 4/2002 | Althoff et al. ............... | 707/102 |
| 6,601,114 B1 | * | 7/2003 | Bracha et al. ............... | 719/332 |
| 6,647,391 B1 | | 11/2003 | Smith et al. ................. | 707/100 |
| 6,684,222 B1 | | 1/2004 | Cornelius et al. ......... | 707/104.1 |
| 6,707,744 B1 | | 3/2004 | Williamson et al. ........ | 707/103 |
| 6,754,670 B1 | | 6/2004 | Lindsay et al. ............. | 707/103 |
| 6,973,560 B1 | * | 12/2005 | Rice et al. ................... | 712/205 |

OTHER PUBLICATIONS

Final Office Action dated Jul. 26, 2005 for U.S. Appl. No. 10/199,949, filed Jul. 20, 2002.
U.S. Appl. No. 10/199,949, filed Jul. 20, 2002 entitled "Map and Data Location Provider".
Office Action dated Nov. 16, 2004 for U.S. Appl. No. 10/199,949, filed Jul. 20, 2002.

* cited by examiner

*Primary Examiner*—Hosain Alam
*Assistant Examiner*—Jacques Veillard
(74) *Attorney, Agent, or Firm*—John D. Veldhuis-Kroeze; Westman, Champlin & Kelly, P.A.

(57) ABSTRACT

A method and system for storing and retrieving data in an object-relational database system includes receiving a query which results in a request to load a first object. The method also includes identifying relationship types of other objects having a relationship with the first object. Then, the first object and those of the other objects which have a composition relationship with the first object are eager loaded. Those of the other objects which have an association relationship with the first object are marked as fault on demand. Preventing re-faulting of the same object in the same object graph, and trimming of graphs for serialization are also provided.

22 Claims, 13 Drawing Sheets

| COMPANY_ID 252 | ORDER_ID 254 | ORDERLINE_ID 256 | SERIAL NO 258 | OTHER COLUMNS | |
|---|---|---|---|---|---|
|  |  |  |  |  |  |
|  |  |  |  |  |  |
|  |  |  |  |  |  |
|  |  |  |  |  |  |
| ⋮ | ⋮ | ⋮ | ⋮ | ⋮ | ⋮ |
|  |  |  |  |  |  |

OBJECT GRAPH FAULTING AND TRIMMING IN AN OBJECT-RELATIONAL DATABASE SYSTEM

BACKGROUND OF THE INVENTION

The present invention relates to database systems.

In conventional relational databases, all data are stored in named tables. The tables are described by their features. In other words, the rows of each table contain items of identical type, and the definitions of the columns of the table (i.e., the column names and the data types stored in the column) describe the attributes of each of the instances of the object. By identifying its name, its column names and the data types of the column contents, a table is completely described. Queries to a relational database are formulated in a query language. One such language is SQL (Structure Query Language) which is widely used in commercial relational database systems. The data types offered by SQL can be classified as character arrays (names), numbers, and data types related to date and time. Tables can be modified or combined by several operations of relational algebra such as the application of Boolean operators, projection (i.e. selection of columns) or the Cartesian product.

Relational databases offer several advantages. Database queries are based on a comparison of the table contents. Thus, no pointers are required in relational databases, and all relations are treated uniformly. Further, the tables are independent (they are not related by pointers), so it is easier to maintain dynamic data sets. The tables are easily expandable by simply adding new columns. Also, it is relatively easy to create user-specific views from relational databases.

There are, however, a number of disadvantages associated with relational databases as well. For example, access to data by reference to properties is not optimal in the classical relational data model. This can make such databases cumbersome in many applications.

Another recent technology for database systems is referred to as object oriented database systems. These systems offer more complex data types in order to overcome the restrictions of conventional relational databases. In the context of object oriented database models, an "object" includes both data and the functions (or methods) which can be applied to the object. Each object is a concrete instance of an object class defining the attributes and methods of all its instances. Each instance has its unique identifier by which it can be referred to in the database.

Object oriented databases operate under a number of principles. One such principle is referred to as inheritance. Inheritance means that new object classes can be derived from another class. The new classes inherit the attributes and methods of the other class (the super-class) and offer additional attributes and operations. An instance of the derived class is also an instance of the super-class. Therefore, the relation between a derived class and its super-class is referred to as the "isA" relation.

A second principle related to object oriented databases is referred to as "aggregation." Aggregation means that composite objects may be constructed as consisting of a set of elementary objects. A "container object" can communicate with the objects contained therein by their methods of the contained objects. The relation between the container object and its components is called a "partOf" relation because a component is a part of the container object.

Yet another principle related to object oriented databases is referred to as encapsulation. According to encapsulation, an application can only communicate with an object through messages. The operations provided by an object define the set of messages which can be understood by the object. No other operations can be applied to the object.

Another principle related to object oriented databases is referred to as polymorphism. Polymorphism means that derived classes may re-define methods of their super-classes.

Objects present a variety of advantages. For example, operations are an important part of objects. Because the implementations of the operations are hidden to an application, objects can be more easily used by application programs. Further, an object class can be provided as an abstract description for a wide variety of actual objects, and new classes can be derived from the base class. Thus, if an application knows the abstract description and using only the methods provided by, the application can still accommodate objects of the derived classes, because the objects in the derived classes inherit these methods. However, object oriented databases are not yet as widely used in commercial products as relational databases.

Yet another database technology attempts to combine the advantages of the wide acceptance of relational databases and the benefits of the object oriented paradigm. This technology is referred to as object-relational database systems. These databases employ a data model that attempts to add object oriented characteristics to tables. All persistent (database) information is still in tables, but some of the tabular entries can have richer data structure. These data structures are referred to as abstract data types (ADTs). An ADT is a data type that is constructed by combining basic alphanumeric data types. The support for abstract data types presents certain advantages. For example, the methods associated with the new data type can be used to index, store, and retrieve records based on the content of the new data type.

Some conventional object-relational databases support an extended form of SQL, sometimes referred to as ObjectSQL. The extensions are provided to support the object model (e.g., queries involving object attributes). However, these object-relational databases are still relational because the data is stored in tables of rows and columns, and SQL, with some extensions, is the language for data definition, manipulation, and query. Both the target of a query and the result of a query are still tables. The extended SQL language is often still the primary interface to the database. Therefore, there is no direct support of host object languages and their objects. This forces programmers to continue to translate between objects and tables.

Data pertaining to the operation of a business such as types of companies forming an enterprise, orders that the company receives from various customers, and what constitutes an order is hierarchical. As discussed above, relational systems for storing data, on the other hand, are tabular in nature, and consequently, do not directly represent hierarchies. Accordingly, object programming models do not represent the hierarchy of business data very well.

In object-relational database systems, most objects or entities have relationships to other objects, forming a graph of objects with relationships between them. For a particular root object or entity identified in response to a query, the object graph can include the root object (and its metadata and other attributes), as well as child objects (and their metadata and other attributes) and associations between the root object and other objects or entities. Managing when and how parts of the graph are faulted in (i.e., retrieved into random access memory from the long term storage device such as a disc drive, or from another system) and how parts of the graph are trimmed when the graph is serialized are important, primarily for achieving high performance.

For high performance it is desirable to have the set of objects expected to be read when the original object is requested rather than being faulted in. This is hereafter referred to as "eager loading." It is also desirable to have the unlikely set of objects to be read not to be eager loaded, but instead "faulted on-demand" when the relationship is traversed. "Faulted on demand" can be defined as an entity whose load has been deferred to that point when it is needed. A given relationship for an object instance is either faulted on-demand or eager loaded, but not both.

It is not efficient to return unused (but related) objects when an object is returned. This is especially true if there are no ways to limit the object graph when retrieving the original object. In this situation, potentially the entire data set in the object graph will be read, with the majority of the objects not needed or used. If in response to a query the entire object graph for the root object is read, system resources are not used efficiently because much of the data may not be needed.

Similarly, it is inefficient to return too few needed objects when an object is requested. If in response to the query less than the entire object graph is returned (i.e., the object graph is "trimmed"), efficiency could be lost due to the latency time required to later fault in the additional objects and associations when later needed. Each subsequent fault involves fixed network and latency overhead, in addition to the persistence layer overhead of having to build and execute a new query. Due to these overhead times associated with faulting, it is often more efficient to eagerly load the needed objects with the original request.

If the consumer on each request specifies which relationships to fault and which to eager load, this results in ideal performance since it can be fine-tuned depending on the scenario. However, this is typically not very convenient for the consumer, and sometimes the consumer does not know in advance what the needed objects are.

Another source of inefficiency relates to duplicate objects. Once an object is faulted in it does not have to be faulted in again (for a given graph instance). In addition to being important for performance, it is also important to prevent duplicate objects in a graph or working set. A duplicate object is a copy of the same information and identity as another object. Note, this not the same as having different references to the same object, which is not a concern or problem.

Not remembering previously faulted objects means that duplicate objects are more likely to get into a graph or working set, which leads to problems with concurrency. For example, updating two copies of the same data will most likely cause the first to succeed and the second to fail due to concurrency issues (the data has already changed after the first update occurs). It is best if the second request for the same object returned the previously found instance, so there is only one copy in memory. However, it has conventionally been difficult to achieve this.

Also, for high performance, it is desirable to have specific non-essential objects trimmed from a serialized graph. A serialized graph is a copy of a graph converted into a format (such as text or binary) that can be persisted to disk, cloned, transported across address spaces and machines or other similar purposes. The primary use of a serialized graph is that it can be de-serialized to create a copy of the original graph. Serializing in this way is also used to marshal (prepare for network transmission) by-value (copy the object rather than an reference to it).

Trimming a graph is important for performance because serialization will not need to occur on the trimmed objects, making the resulting serialized graph smaller in memory. Trimming a graph improves de-serialization performance because there are fewer objects to de-serialize.

SUMMARY OF THE INVENTION

A method and system for storing and retrieving data in an object-relational database system includes receiving a query which results in a request to load a first object. The method also includes identifying relationship types of other objects having a relationship with the first object. Then, the first object and those of the other objects which have a composition relationship with the first object are eager loaded. Those of the other objects which have an association relationship with the first object are marked as fault on demand. Preventing re-faulting of the same object in the same object graph, and trimming of graphs for serialization are also provided.

DETAILED DESCRIPTION OF ILLUSTRATIVE EMBODIMENTS

It should be noted that the inventive features of the invention can be applied to O-R databases or relational databases, because the invention bridges the capabilities of both types of databases as well as the capabilities of object oriented programming languages. The result is an O-R database system that provides significant advantages over prior database technology. It will be described herein in terms of applying to an O-R database, for the sake of illustration only, as it is equally beneficial for relational databases.

Overview

Figure 1:
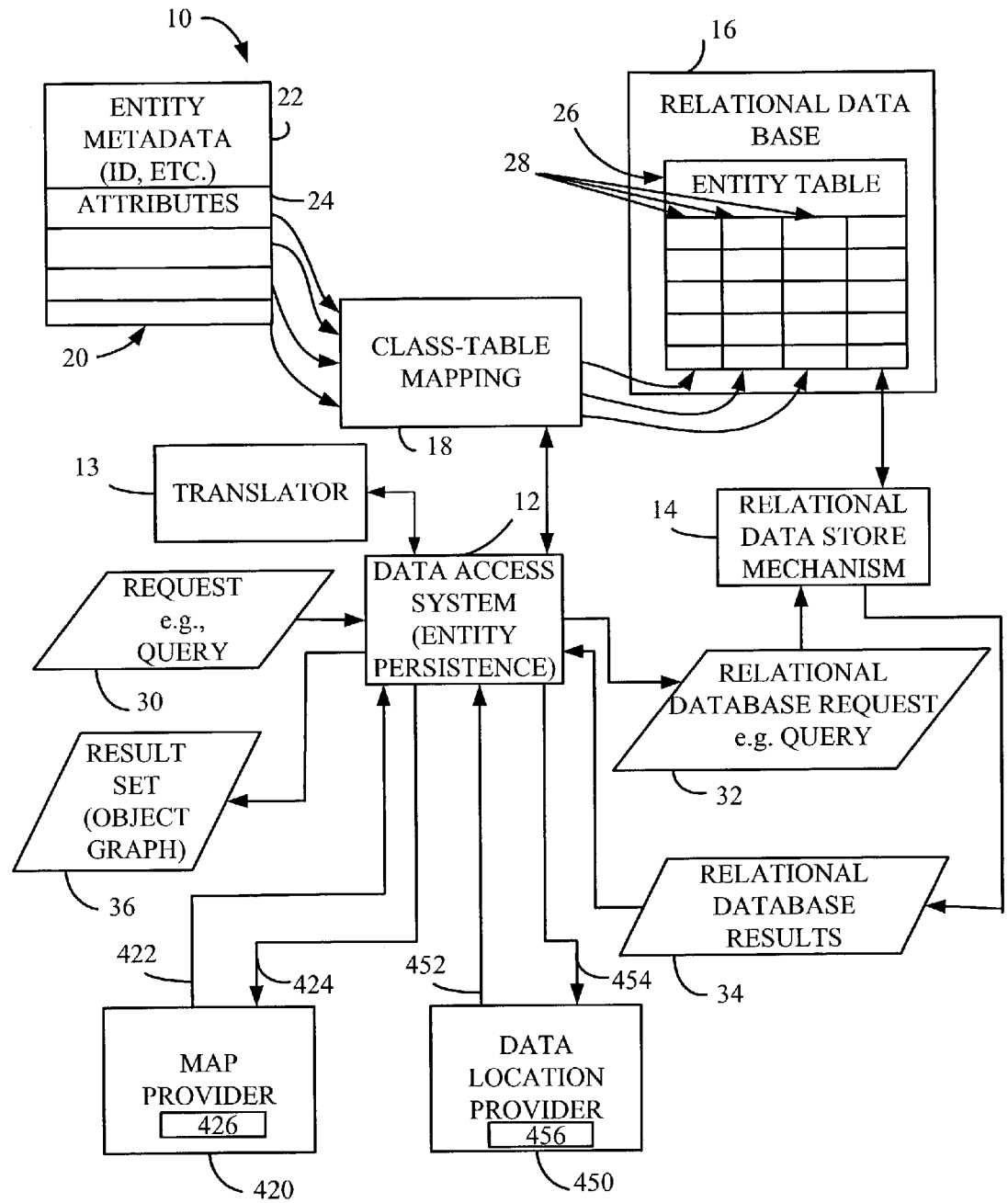
FIG. 1 is a block diagram of one embodiment of an object-relational data storage system.

FIG. 1 is a block diagram illustrating one embodiment of a data storage and accessing system 10 in accordance with the present invention. System 10 includes data access system (or entity persistence system) 12, relational data store mechanism 14, relational database 16, and class-table mapping 18. System 10 is illustratively an object-relational (O-R) data storage system in which stored data can be referred to in terms of entities (or objects) and their properties, rather than elements of the database schema, such as tables and columns. FIG. 1 illustrates one mechanism for doing this.

As shown in FIG. 1, the data can be organized in terms of entities 20 (which is used interchangeably herein with the term objects). Each entity illustratively includes a metadata portion 22 and a remaining attributes portion 24. The metadata portion 22 describes the entity 20, while the remaining attributes 24 define further attributes of entity 20, such as the data stored therein. Each of the attributes in entity 20 is mapped to a corresponding entity table 26 and a specific column 28 in a given entity table 26.

Data access system 12 can receive various forms of requests such as a query 30 which specifies an entity, or portions of an entity or group of entities, to be retrieved. Query 30 can illustratively be expressed in terms of objects ("entities") and properties, rather than in terms of tables and columns. The particular manner in which queries are expressed is described in greater detail below.

In any case, data access system 12 receives the query 30 and accesses class-table mapping 18. In this way, data access system 12 can determine the location of the data for the entities identified by query 30. Data access system 12 includes a translator 13 that translates query 30 into a relational database query 32 which is suitable for input to relational data store mechanism 14. In one illustrative embodiment, relational data store mechanism 14 is a SQL SERVER database server such as that available from the Microsoft Corporation of Redmond, Wash., that accesses a relational database 16. Therefore, data access system 12 receives queries 30 in terms of objects and translates those queries into an appropriate relational database query 32 that is then provided to the data store mechanism (or server) 14 which actually accesses the data in relational database 16.

Relational data store mechanism 14 retrieves the requested data and returns it in the form of relational database results 34. The results are returned to data access system 12 which then formulates the relational database results 34 into a requested result set 36. In one illustrative embodiment, result set 36 is requested in query 30. Query 30 may request that the results be output in the form of one or more objects or simply as a data set. In any case, data access system 12 arranges the relational database results 34 into the proper format and outputs them as result set 36. Data access system 12 hides the physical data store (mechanism 14 and database 16) from the users and developers enabling them to work in terms of entities rather than requiring them to know both the schema of database 16 and the syntax of the particular data store mechanism 14. Before describing this in greater detail, FIG. 2 shows one embodiment of an environment in which the present invention can be used.

Figure 2:
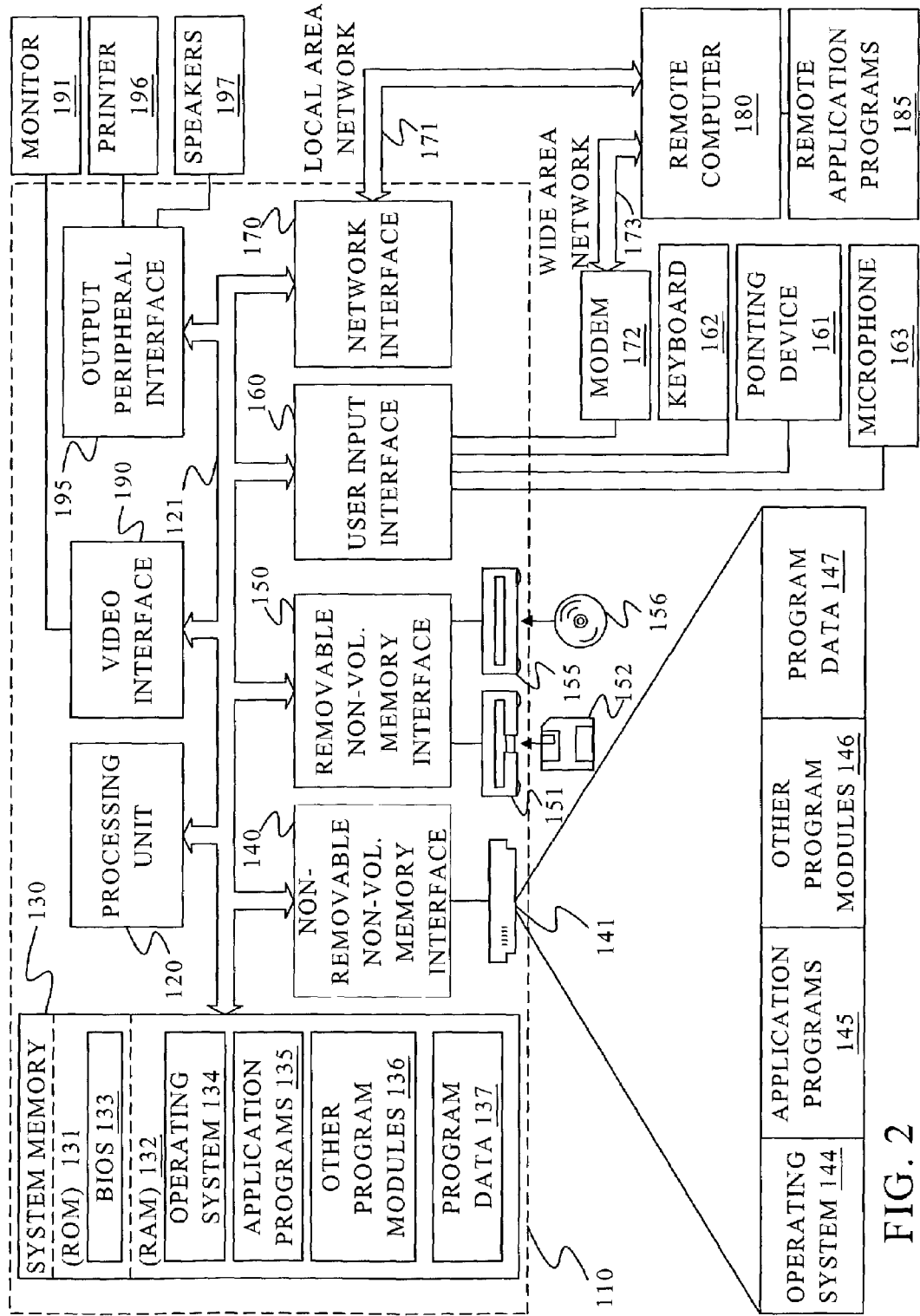
FIG. 2 is a block diagram of an environment in which the present invention can be used.

FIG. 2 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 2, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way o example, and not limitation, FIG. 2 illustrates operating system 134, application programs 135, other program modules 136, and program data 137.

The computer 110 may also include other removable/non-removable volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computer 110. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 2 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 2 illustrates remote application programs 185 as residing on remote computer 180. It will be appreciated that the network connections shown are exemplary and other means of establishing a communications link between the computers may be used.

It should be noted that the present invention can be carried out on a computer system such as that described with respect to FIG. 2. However, the present invention can be carried out on a server, a computer devoted to message handling, or on a distributed system in which different portions of the present invention are carried out on different parts of the distributed computing system.

Containment Hierarchy

Figure 3:
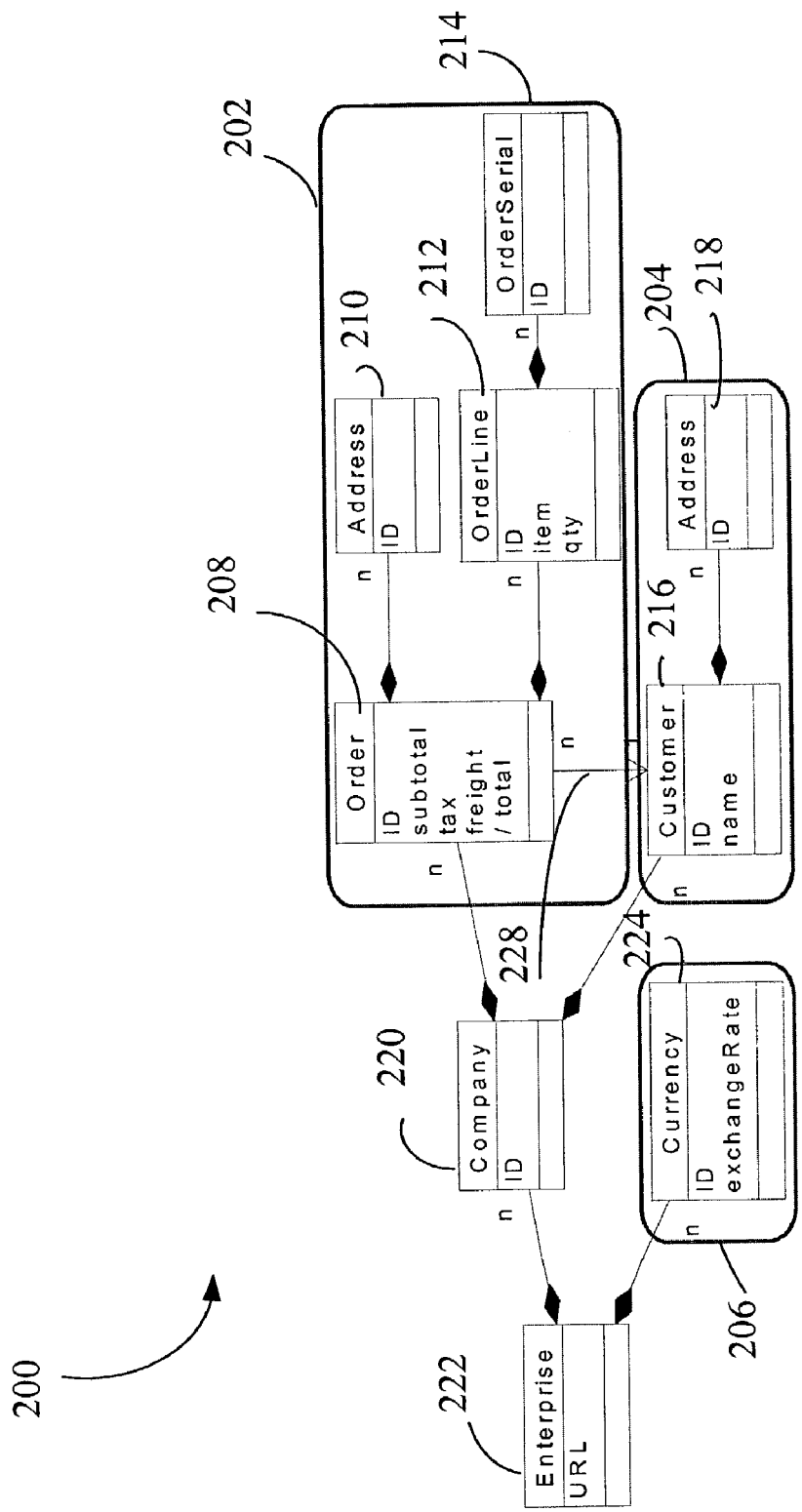
FIG. 3 is a pictorial representation of a containment hierarchy.

FIG. 3 is an example of a hierarchical structure 200 of an exemplary application comprising objects or entities. As illustrated, entities can be organized as components 202, 204 and 206, which can comprise one or more entities . A component, as used herein, is one or more entities grouped together to achieve a common purpose. Although modules implementing the present invention may not include references to components, a developer may want to design the application with components in mind.

In the exemplary embodiment, the entities or objects are organized in a parent/child relationship. Component 202 includes those entities that constitute an Order for a company. In particular, an Order entity 208 includes information such a subtotal, tax, freight and total properties. An Address entity 210 is a child entity of the Order entity 208 and may include information pertaining to the shipping address for a specific order. Likewise, the Order entity 208 may include a number of OrderLine entities 212, while each OrderLine entity 212 can comprise one or more OrderSerial entities 214 having further information. It should be noted that the notation "n" in FIG. 3 is used to indicate that the particular entity could comprise a number of identically structured entities. For example, as indicated above, one or more OrderSerial entities 214 can be a child entity (indicated by the diamond line) of an OrderLine entity 212.

In the example herein illustrated, component 204 generally pertains to Customer information and includes a Customer entity 216, where each Customer entity 216 can include one or more Address entities 218.

The Customer entities 216 and the Order entities 208 are each child entities of a Company entity 220, the set of which comprise child entities of an Enterprise entity 222. Component 206 comprising, in this example, one or more currency entities 224 is also a child of the Enterprise entity 222.

Besides the parent/child hierarchy of structure 200, there also exists, in this example, a uni-directional association between classes of entities. A class is a set of similarly structured entities. As indicated above, all of the Order entities 208 fall within an Order class. Likewise, the Customer entities 216 pertain to a Customer class. The association indicated by arrow 228 denotes that a class may know of another class. In this example, the Order class knows about the Customer class, but does not incorporate or own it such as in the case of a parent/child relationship.

Entity Key

An entity manages data. The entity preserves its internal data and the integrity of its relationships with other entities. Data of the entity is accessed through properties. Each entity is a form of an abstraction. Characteristics of an entity also include that it has an identity, represented by a subclass of an abstract class "EntityKey". Within the overall hierarchy, each entity that manages data in structure 200 is location independent in that it does not know where it is stored or who owns it. However, the EntityKey is used to define its relationship with other entities and can be thought of as being represented by the connections in FIG. 3.

An instance of an entity may be contained within an instance of another entity. The contained entity is called the child, while the container is called the parent. A child instance cannot exist longer than its parent and must have one and only one parent. The set of all such relationships for an application is its containment hierarchy. This sort of hierarchy parallels many business applications. It has been found that supporting this hierarchy makes the system a better fit for developers in constructing business applications.

FIG. 3 is an example of a containment hierarchy for an application. The containment hierarchy describes the types of entities and their corresponding parent-child relationships. There is a root of the containment hierarchy, herein illustrated as the "Enterprise" container 222. The root container or entity commonly supplies the address of a server for the containment hierarchy, although classes or instances can be located on other servers or computer readable media. In one embodiment, the root entity supplies the URL (Universal Remote Locator) of the server. In this embodiment, another broad class of containers are the Company entities 220.

It should be noted that the containment hierarchy is not the same as an inheritance hierarchy. Inheritance hierarchy is a classification of relationships in which each item except the top one is a specialized form of the item above it. In the example of FIG. 3, the Order class 208 and the Customer class 216 are not specialized forms of the Company class 220. Rather, the Order class 208 and the Customer class 216 are different classes holding different types of information. This is not to say inheritance can not be present in the Containment Hierarchy. In some embodiments, an inheritance hierarchy may be present for any class. Thus, for example there can be variations within a class such as variations of the Customer class 216

There are three forms of entities in an application. The forms include the component containers "Enterprise" 222 and "Company" 220, primary entities and supporting entities. The primary or root entity is the focus of a component container of the same name, while supporting entities are either children of the primary entity or its peers. For example, the Order component 202 consists of the Order root entity 208, while the Address 210, OrderLine 212 and OrderSerial 214 are supporting entities. The data for entities is usually stored in database tables such as described above with respect to FIG. 1. Components are a unit of logical design and do not interact with the database.

Figure 8:
FIG. 8 is a pictorial representation of a database table.

As indicated above, each of the properties in an entity 20 is mapped to a corresponding entity table 26 and a specific column 28 in a given entity table 26 as illustrated in FIG. 1. Each entity table also includes, in addition to columns for the attributes, one or more columns that identify all the parents of a particular entity. Referring to FIG. 8 and using OrderSerial by way of example, the OrderSerial Table 250 would include columns for identifiers, in particular, "Company_id" 252, "Order_id" 254, OrderLine_id 256 and Serial Number 258, which may comprise one of the attributes, and which may function as its own identifier (id).

In a relational database, interaction with the table would require specifying each of the identifiers in order to identify and work with the data associated with a particular entity, in this example, data associated with a specific OrderSerial entity 214. However, this information is inferred from its parent in the containment hierarchy. For instance, if one is working with a particular OrderLine entity 212 and now wants to inquire about, or perform an action upon, a OrderSerial entity 214, the data access system 12 can ascertain which OrderSerial entity or entities the user is referring to without needing to reidentify the parents of the entity. In the present invention, the containment hierarchy allows the relationship of the tables (i.e., the identifiers such as illustrated in FIG. 8), and hence, the relationship of the entities, be an implicit background piece of information. In other words, the identity of the entity is inferred from parent/child relationship so that it doesn't need to be restated or managed in other ways. In a relational database system, the identifiers found in the tables used to identify the entity are called a primary key, wherein the combination of the identifiers is unique. However, typically, primary keys are just a collection of columns and have no rich behavior attached to them. In addition, user selected identifiers may only be unique within a certain scope (such as a single business unit) and not unique over the entire range of the application. Surrogate keys, which are commonly generated by the application and hidden from the user, may be unique, but they do not describe hierarchies such as who is the parent of the entity referred to by the identifier.

Another aspect of the present invention is an EntityKey that solves these problems, in particular, the EntityKey associated with each entity allows each entity to be unique throughout the containment hierarchy, as well as infer from the position of the entity within the containment hierarchy who the parents are. An entity is an object that is identified by an entity key, or stated differently, the key for an entity. An EntityKey serves the same function as the primary key on a relational table; however, unlike a relational primary key it is universally unique across the application space and is hierarchical, i.e. it is aware of its position in the hierarchy. In the architecture, the EntityKey is a defined class that is distinct from the entities. The EntityKey class can be mapped to a relational database table in a manner similar to entity 20, class-table mapping 18 and entity table 26. Every entity throughout the hierarchy has one and only one EntityKey value. Given the key for an entity, one can retrieve the entity, whether it is on a local server, or located in a wide area network such as the Internet.

Figure 4:
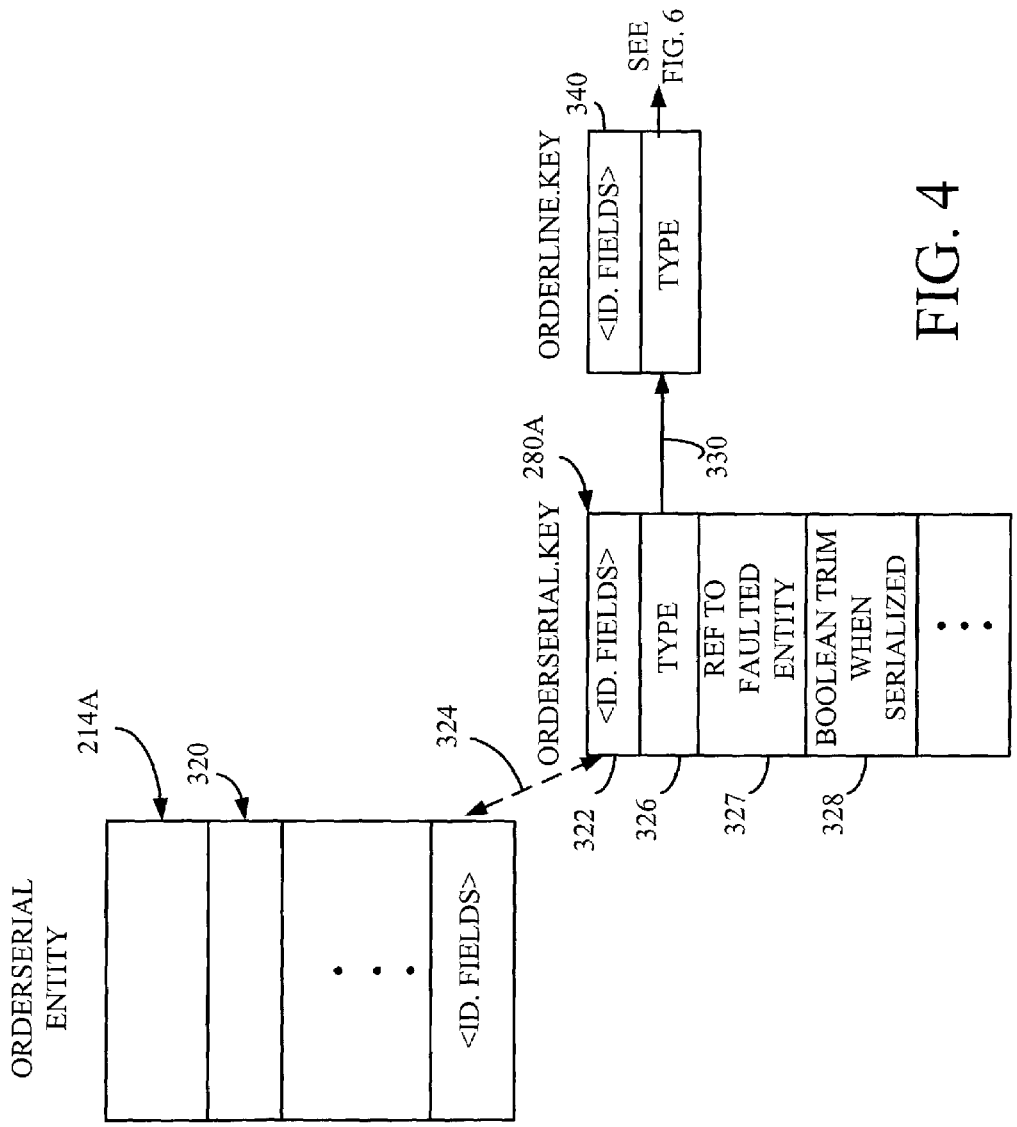
FIG. 4 is pictorial representation of an entity and an entity key.

Each EntityKey contains, for purposes of this concept, three pieces of information: the type or class of the entity to which it refers, the ID of that entity to which it refers and information as to the EntityKey of the parent to that entity. FIG. 4 is a pictorial representation of an EntityKey (herein, OrderSerial.Key) 280A for a particular OrderSerial entity 214A.

Figure 5:
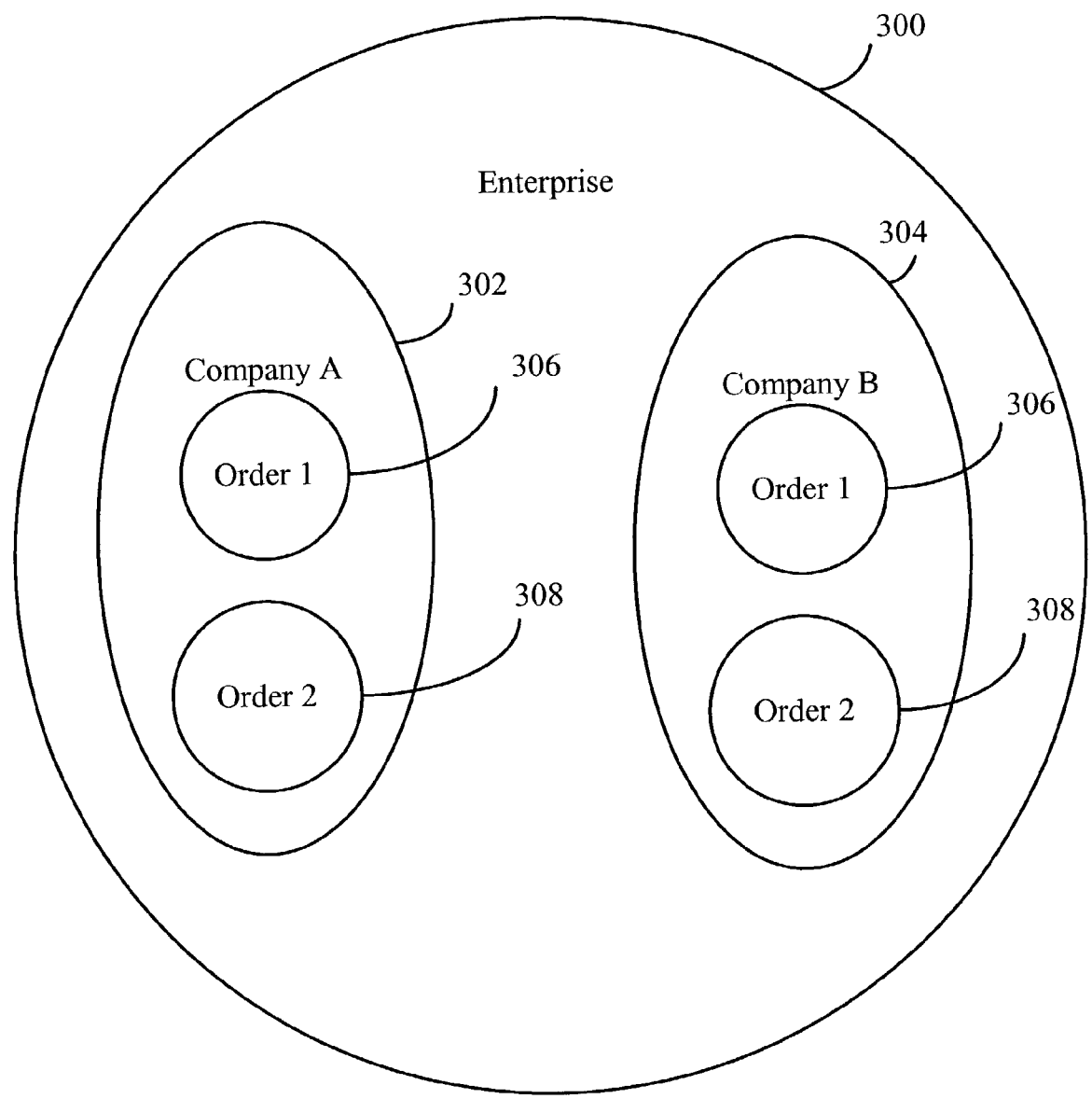
FIG. 5 is a pictorial representation of entities in a business application.

An entity in the hierarchy is fully identified by its identifier plus that of its parents. In this manner, the same local identifier can be used in two or more locations of the overall space because different parents would be involved in uniquely identifying the entity. This may be more readily apparent by pictorially representing the Enterprise space of FIG. 3. Referring to FIG. 5, the Enterprise is indicated by circle 300. The Enterprise 300 can include a plurality of companies, herein Company A 302 and Company B 304. However, each Company 302 and 304 can have two Orders, both having the same identifier, herein "Order 1" 306 and "Order 2" 308. Nevertheless, entities within Company A 302 would still be uniquely identified with respect to entities of Company B 304 although the identifiers for Order 1 306 and Order 2 308 have been used within each Company because each of the entities is uniquely identified by its associated key having the parent/child relationships of the hierarchy.

It should be noted that in many applications, the data for Company A is stored in a completely different database then the data for Company B.

There is also a separate, independent class associated with OrderSerial 214 herein identified as OrderSerial.Key. In general, the EntityKey is of a separate class than the class it refers to. Entity 280A is an example of an object of the OrderSerial.Key class. Referring back to FIG. 4, the Order-Serial entity 214A contains all the attributes 320 relevant to the Order Serial, which could be any number of attributes. The OrderSerial.Key 280A contains a subset of one or more attributes of the OrderSerial entity 214A specifically, the OrderSerial.Key includes identifier attributes 322. Thus, if OrderSerial entity 214A includes a thousand attributes, but two of the attributes make each OrderSerial entity unique, those attributes get copied into the OrderSerial.Key to form the identifier back to the entity. Arrow 324 represents the common identifier attribute or attributes between entity 214A and entity 280A.

The attribute or attributes of the OrderSerial.Key that make each entity of OrderSerial unique is the first element of an EntityKey, which thereby allows the key to be associated with a particular entity.

A second element of an EntityKey is the type 326 of the entity to which it has an identifier. In the present example, the type of the class is OrderSerial.

A third element of an EntityKey is information about the EntityKey of the parent of the entity. In the present embodiment, this information is a reference, indicated by arrow 330, to the parent key 340 corresponding to the parent of entity 214A. In other words, the third element could be a reference to another key. This structure makes EntityKeys recursively defined However, it should be understood that some or all of the parent key information could be stored in the EntityKey directly, if desired. It should be understood that these forms and other similar forms for storing and accessing EntityKey information is intended to be covered herein.

Figure 6:
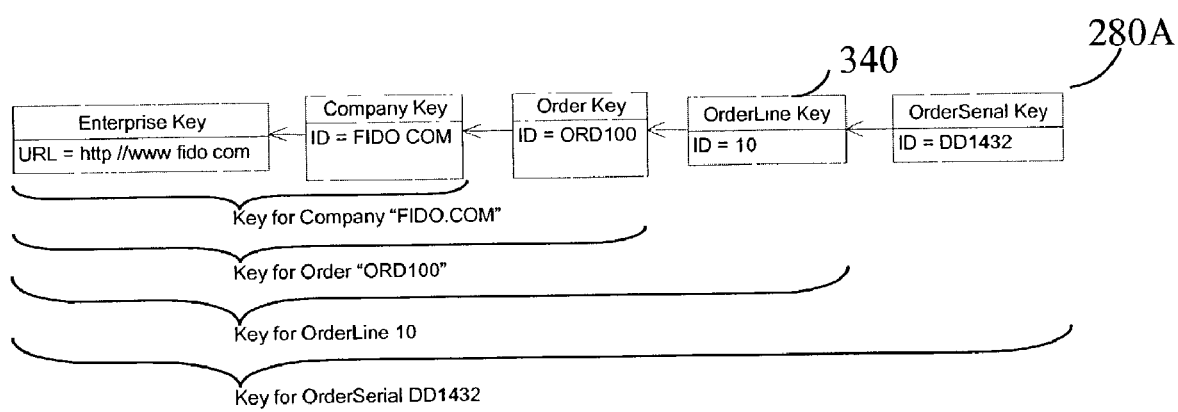
FIG. 6 is a pictorial representation of an entity key.

Referring now to FIG. 6, EntityKeys are provided for an entity of Company, an entity of Order, an entity of OrderLine and entity of OrderSerial. In this example, the ID constitutes one field and the type can be ascertained from the name of the key. For example, type OrderSerial is obtained from the name OrderSerial.Key. References to parent keys are illustrated by arrows. Thus, again, the location of an entity in the hierarchy is completely defined by the associated EntityKey.

In the recursive form of storing EntityKeys, it should be noted that although each EntityKey includes type or class information to which it pertains it does not know the type or class of its parent. That information is found by looking at the type information in the parent key that it references. This is a particularly advantageous feature for it allows classes to be reused throughout the containment hierarchy. Referring back to FIG. 3, it is illustrated that the Order class 202 has a child class of Address 210. Likewise, the Customer class 216 also has a child class of Address 218. The Address classes 210 and 218 are actually conceptually the same; but the instances are disjoint since they are under different parents. However, the entities are uniquely defined in each form of Address class, wherein each Address class 210 and 218 may be stored in a different database table. In this manner, one can describe a position in the containment hierarchy without forcing a class to forever be in that position.

As explained above, each EntityKey has information such as a reference to its parent key, but it does not know what type of parent it is. The decision of what type of parent is made or defined by the mapping(s) 18 illustrated in FIG. 1 for the complete set of classes and tables.

The set of identifiers 322 as illustrated in FIG. 4 of an EntityKey corresponds to the primary key columns of a table holding the data for that entity. Referring to FIG. 8, assume that the primary key of the table holding OrderSerial entities is Company_ID 252, Order_ID 254, OrderLine_ID 256, and Serial Number 258. The identifier attribute 322 in the OrderSerial.Key 280A is mapped directly to the last of the primary key columns, while the parent keys of 280A are mapped to columns 252, 254, 256 in a similar fashion. This EntityKey to database key correspondence also extends to foreign keys. All simple associations between entities are implemented using keys. For example, in FIG. 3, Order.Key would have a reference of type Customer.Key that implements the association from Order to Customer. This key can easily be mapped to the Customer foreign key in the Order table.

It should also be noted that tables are commonly designed with surrogate rather than intelligent keys. An intelligent primary key is seen and specified by the end user, while a surrogate primary key is generated by the application and hidden from the user. Surrogate keys are often used to allow renaming the user visible identifier of a table without database impact or to save space when the size of the primary key is very large and often referenced in foreign keys. When surrogate keys are used, the table will have the surrogate primary key and an alternate key having the user visible identifier.

Both intelligent and surrogate EntityKeys are supported. In the present embodiment, if a surrogate EntityKey is used its ID properties are private (since they are generated and hold ho meaning to the consumer of the entity); otherwise they are public.

Class Key

A second related abstraction is the Class Key. Since a given entity can be used in more than one place in the containment hierarchy, there is a mechanism for indicating which node in the hierarchy to process. The Class Key is that mechanism and contains two pieces of information: the type of the entity to which it refers and information as to the Class Key of the parent of the entity. Note the similarity to the definition of the EntityKey. In fact, the EntityKey is a derivative of and inherits from the Class Key, thereby allowing an EntityKey to be supplied anywhere a Class Key is required. Thus the Class Key is also hierarchically defined. The illustration of FIG. 6 of an EntityKey can be changed into an illustration of a Class Key by simply removing the entity identifiers (IDs).

Generally the Class Key can be used to reference a node in the containment hierarchy as it pertains to classes of entities, particularly describing uniquely a name for each class in the hierarchy as well as its position in the hierarchy. In contrast, the EntityKey provides a unique name for each entity in the containment hierarchy and describes its position in the hierarchy.

The EntityKeys and Class Keys are used when performing create, read, update and delete operations on business objects or entities. For example, when reading an entity, a parent key referring to a component container should be provided. This provides a scope for the read and also makes it easier for the developer to specify a complex location in the hierarchy.

Figure 7:
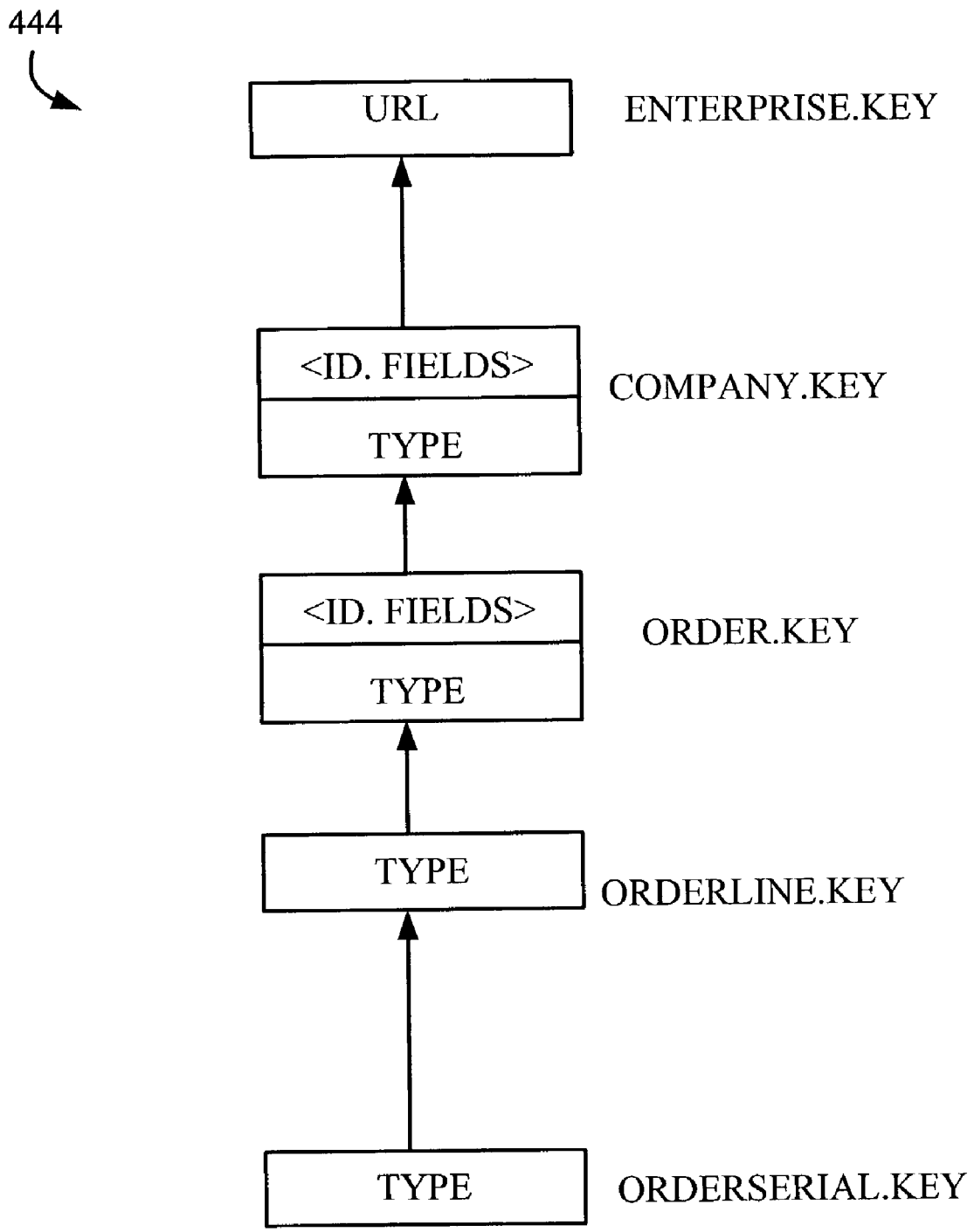
FIG. 7 is a pictorial representation of a blended key.

Besides EntityKeys and Class Keys, another form of key is a blend between these keys. As discussed above, an EntityKey is a form of a Class Key, but includes further information to a particular entity (i.e., its identifier attributes). By simply using a chain of Class Keys followed by Entity Keys, all the entities under a particular parent can be ascertained. FIG. 7 illustrates an example of a blended key 444. In this example, EntityKeys have been provided for the Enterprise, Company and Order, which in turn has specified a particular Order entity. However, since the OrderLine.Key and the OrderSerial.Key do not include Ids, they are Class Keys. The blended key 444 of FIG. 7 could be received by the data access system 12 to formulate a query for data store mechanism 14 to retrieve all series for a particular order, irrespective of line.

Object Graph Faulting and Trimming

As noted previously, in object-relational database systems, most objects (entities) have relationships to other objects, forming a graph of objects with relationships between them in response to a query. Referring for a moment back to FIG. 1, result set 36 provided by data access system 12 in response to a query can be a data set which is commonly referred to as an object graph. An object graph can be defined as including an object, objects having a parent-child relationship with that object, and any associations to other objects. Stated alternatively, an object graph includes a root object, and objects having a relationship with the root object, unless the object graph is trimmed to exclude some of these during initial loading.

Relationships between entities or objects, for the purpose of describing the invention, are categorized into either "associations" or "compositions." Associations are a weaker form of relationship than compositions. Associations describe a dependency from an object to some other object. Compositions describe parent-child relationships where a child's lifetime is bounded by that of its parent.

As an example of the data which can be included in an object graph, reference is again made to the example provided in the class diagram shown in FIG. 3. Considering Order object 208 as the root object, child objects 210, 212 and 214 which can be included in the object graph provided at result set 36 have composition relationships with Order object 208. Customer object 216 and Address object 218 have association relationships with Order object 208.

Relationships are also categorized depending on their cardinality, or the possible number of objects related per relationship. For the purpose of the invention, only two types of cardinality exist: a cardinality of "one" or a cardinality of "one or more". The class used to express a cardinality of one is the EntityKey. The class used to express a cardinality of greater than one is called an EntityCollection. These classes include a mechanism to return the object or set of objects for both eager loading and faulting.

Default Trimming for a New Graph

Figure 9A:
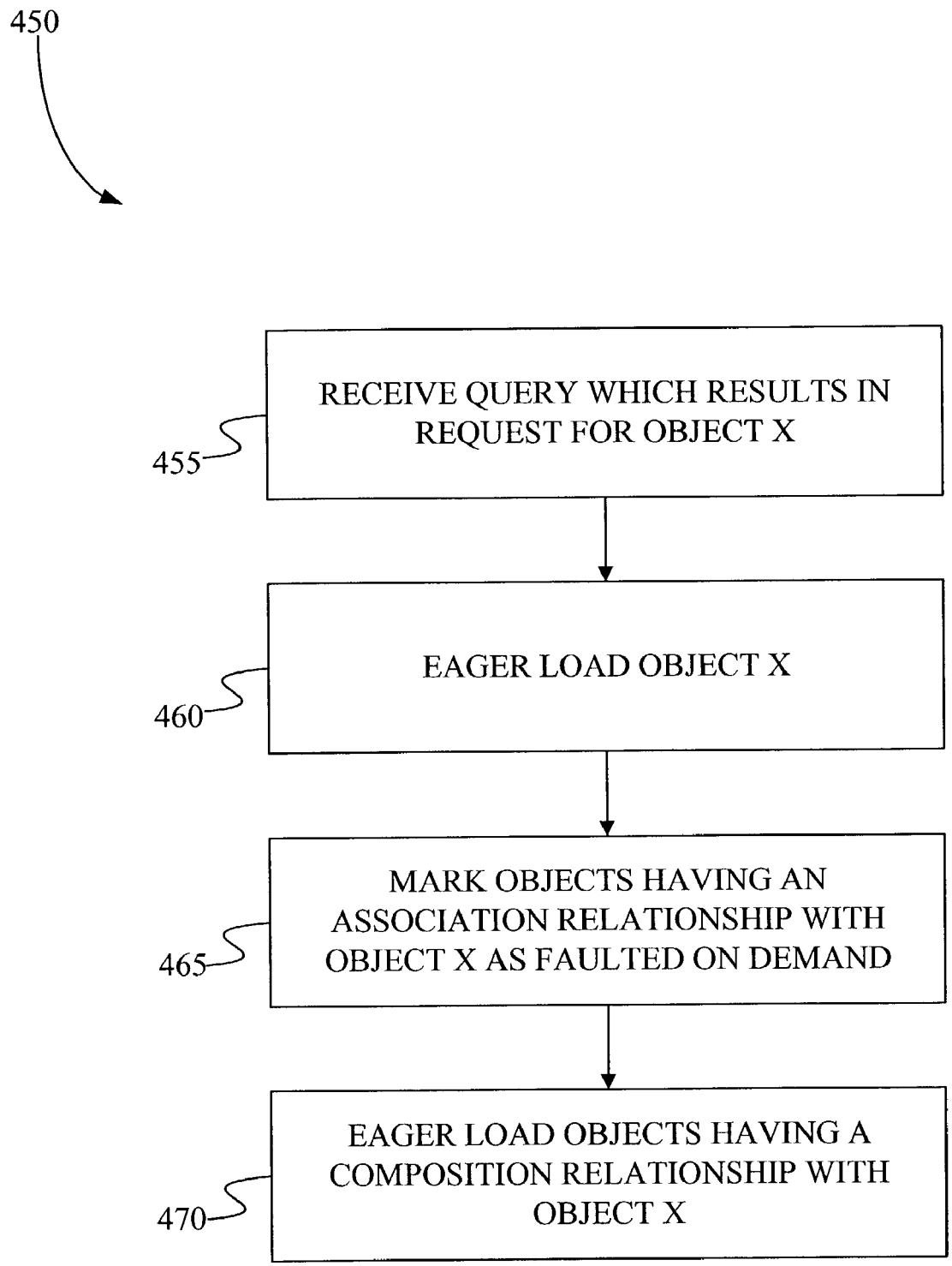
FIG. 9A is a flow diagram illustrating a method of eager loading objects or marking them as faulted on demand in response to a query.

In order to improve performance of the query retrieval process performed by data access system 12 and/or relational database store mechanism 14, the present invention includes a method of managing which objects are "eager loaded" in response to the query, and which objects are "faulted on demand" in response to the query. In other words, the present invention includes a method of trimming the new object graph provided at result set 36 in response to a query. This method is illustrated in flow diagram 450 shown in FIG. 9A, and alternatively in flow diagram shown in FIG. 9B.

As shown at 455, the method includes receiving a query which results in a request for object X to be retrieved. As would be expected, object X is eager loaded in response to the query as is shown at 460. In accordance with the present invention, the determination as to which objects having a relationship with object X are eager loaded and which are marked for faulting on demand is made based upon the type of relationship as is shown at 465 and 470 in FIG. 9A. In one embodiment, this decision is made using the following rules:

When requesting a given object X, all associations from X to other objects are faulted on demand.

When requesting a given object X, all compositions from X to other objects are eager loaded.

Both of these two rules are "recursive," meaning that the same two rules apply to any eager loaded objects.

Figure 9B:
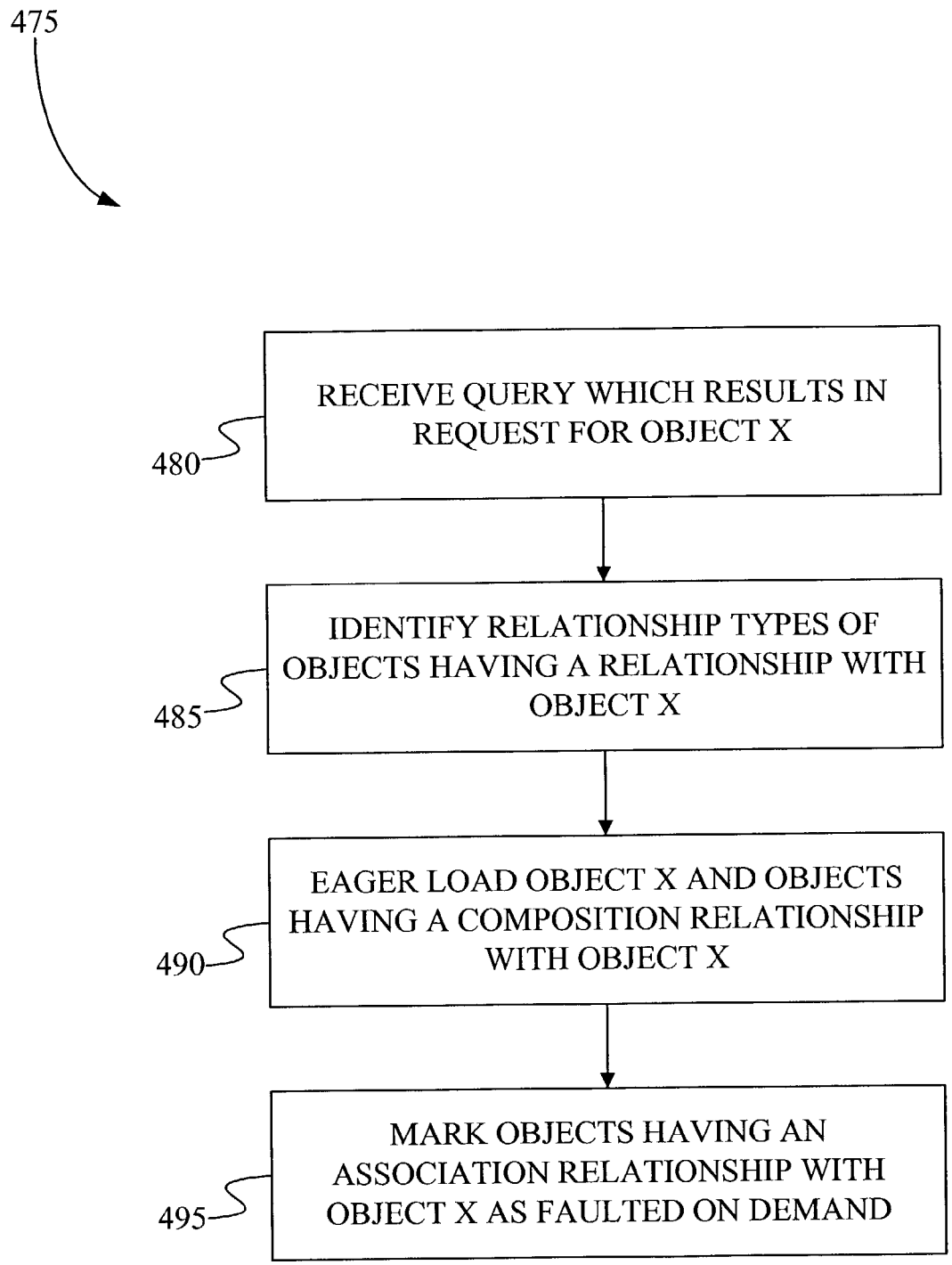
FIG. 9B is a flow diagram illustrating an alternate method of eager loading objects or marking them as faulted on demand in response to a query.

FIG. 9B illustrates a flow diagram 475 which describes an alternate embodiment of the method of trimming the new object graph. This method includes more explicitly the step of identifying or determining relationships between objects. First, as shown at 480, a query is received which results in a request for retrieval of object X. In response, at 485, objects having a relationship with object X are identified or determined. Then, as shown at 490, object X and other objects having a composition relationship with object X are eager loaded. Objects having an association relationship with object X are marked for faulting on demand as shown at 495.

Figure 10:
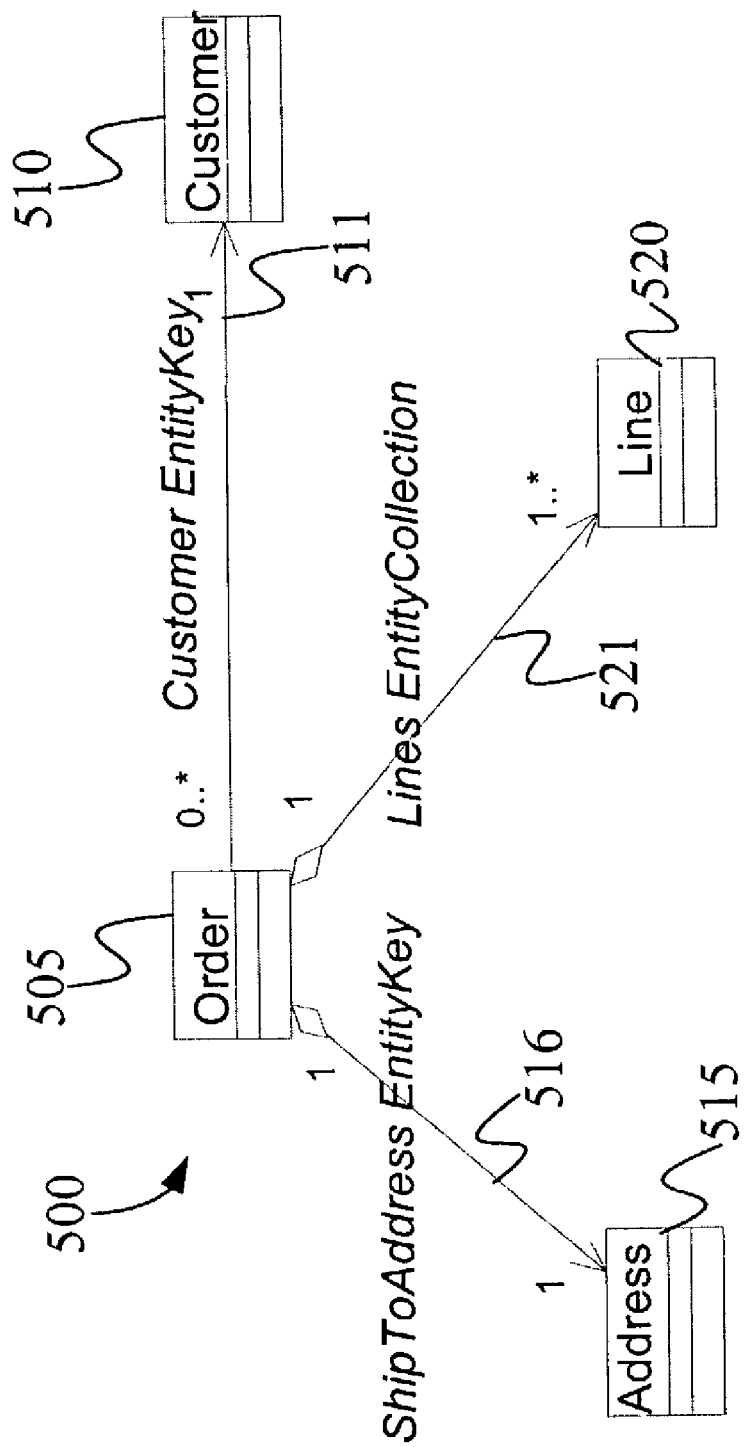
FIG. 10 is a pictorial representation of object relationships.

FIG. 10 is a unified modelling language (UML) diagram of four classes (Order 505, Customer 510, Address 515 and Line 520), with three types of relationships:

Customer EntityKey (shown diagrammatically at line 511): This is an association with cardinality of one;

ShipToAddress EntityKey (shown diagrammatically at line 516): This is a composition with cardinality of one;

Lines EntityCollection (shown diagrammatically at line 521): This is a composition with cardinality of greater than one.

Note that the composition relationships illustrated in FIG. 10 are illustrated with a diamond at the tip of lines 516 and 521.

The scenario illustrated in FIG. 10 is to retrieve an instance of Order. Assume a programming model as such:

Order order=myOrders.Find("ORDER001");

This Find invocation will return an instance of Order 505. In accordance with the invention, the system eager loads all compositions in the same invocation as the request for Order. For example, the Lines 520 and the Address 515 will be eager loaded. This means that the ShipToAddress EntityKey 516 and Lines EntityCollection 521 contain the Address and Lines instances in memory which are accessible using the instance of Order returned.

Customer 510, however, being an association will not be eager loaded in the Find invocation. The Customer EntityKey 511 (on the Order) however will be initialized so that it contains the information such that if Customer 510 is asked for later (through the Order), it can be faulted in. For example, assuming an instance of Order has already been retrieved—Customer is then retrieved later as follows:

Customer cust=order.CustomerKey.GetEntity( );

Note that the methods of the invention cover default faulting. In some embodiments, there is faulting support such that the author of a class, because he or she knows the relationships very well, changes the default. Also, in some embodiments, the consumer is allowed to specify hints or be explicit in what should be eager loaded or faulted on demand.

Referring for the moment back to FIG. 4, a further description of attributes of an EntityKey is provided with reference to OrderSerial.Key entity 280A. For example, the common identifier attributes between entity 214A and entity 280A, represented by arrow 324, are also indicative of the relationship between corresponding entities or objects. Thus, this information is used by the system when determining or identifying whether a relationship is a composition or an association for purposes such as trimming a new graph, for example in steps such as those shown at one or more of 465, 470, 485, 490, and 495.

Another attribute can include a reference 327 to the object or entity to which the particular EntityKey corresponds once that particular object or entity has been marked as faulted on demand or has been loaded. Use of this attribute is discussed below with reference to preventing re-faulting. Yet another attribute can include a Boolean "trim when serialized" variable 328 which is indicative of whether the object or entity to which the particular EntityKey corresponds is to be trimmed during or prior to serialization. Use of this attribute is discussed below with reference to trimming an existing graph. Although not shown in FIG. 4, OrderLine.Key 340 can have similar additional attributes.

Preventing Re-faulting

In accordance with another aspect of some embodiments of the invention, a method is provided for preventing re-faults or reloading of a single object or a set of objects. Recall that duplicate objects are a source of inefficiency. Once an object is faulted in it does not have to be faulted in again (for a given graph instance). In addition to being important for performance, it is also important to prevent duplicate objects in a graph or working set. A duplicate object is a copy of the same information and identity as another object, and duplicate objects frequently lead to problems with concurrency.

In accordance with the present invention, once an object is faulted, then it will not be faulted again in the same graph or working set. Referring to FIG. 10, this means if the same code is executed again using the same instance of Order:

cust=order.CustomerKey.GetEntity( );

then the same instance of Customer is returned by the second invocation to CustomerKey's GetEntity( ) as the first invocation to CustomerKey's GetEntity( ).

Preventing re-faulting of an object or entity is possible because of the structure of the attributes of an EntityKey and EntityCollection in accordance with the invention. Referring again back to FIG. 4 to consider an example, upon receipt of a query which would result in faulting or loading of an object or entity, a reference attribute such as attribute 327 of OrderSerial.Key 280A is checked to make certain that the object or query has not already been faulted. Recall that a reference attribute 327 of an EntityKey refers to the corresponding object or entity to which the particular EntityKey corresponds once that particular object or entity has been faulted or loaded. EntityCollection (sets of objects) include the same or similar mechanisms as EntityKey for preventing re-faulting. EntityCollection faults and prevents re-faulting basically the same way as the EntityKey—it contains the information necessary to fault (EntityCollection contains an EntityCriteria object and a reference to the current entity's parent key) and once faulted, the presence of an internal collection object being non-null is used on subsequent requests to determine if the EntityCollection is faulted.

Figure 11:
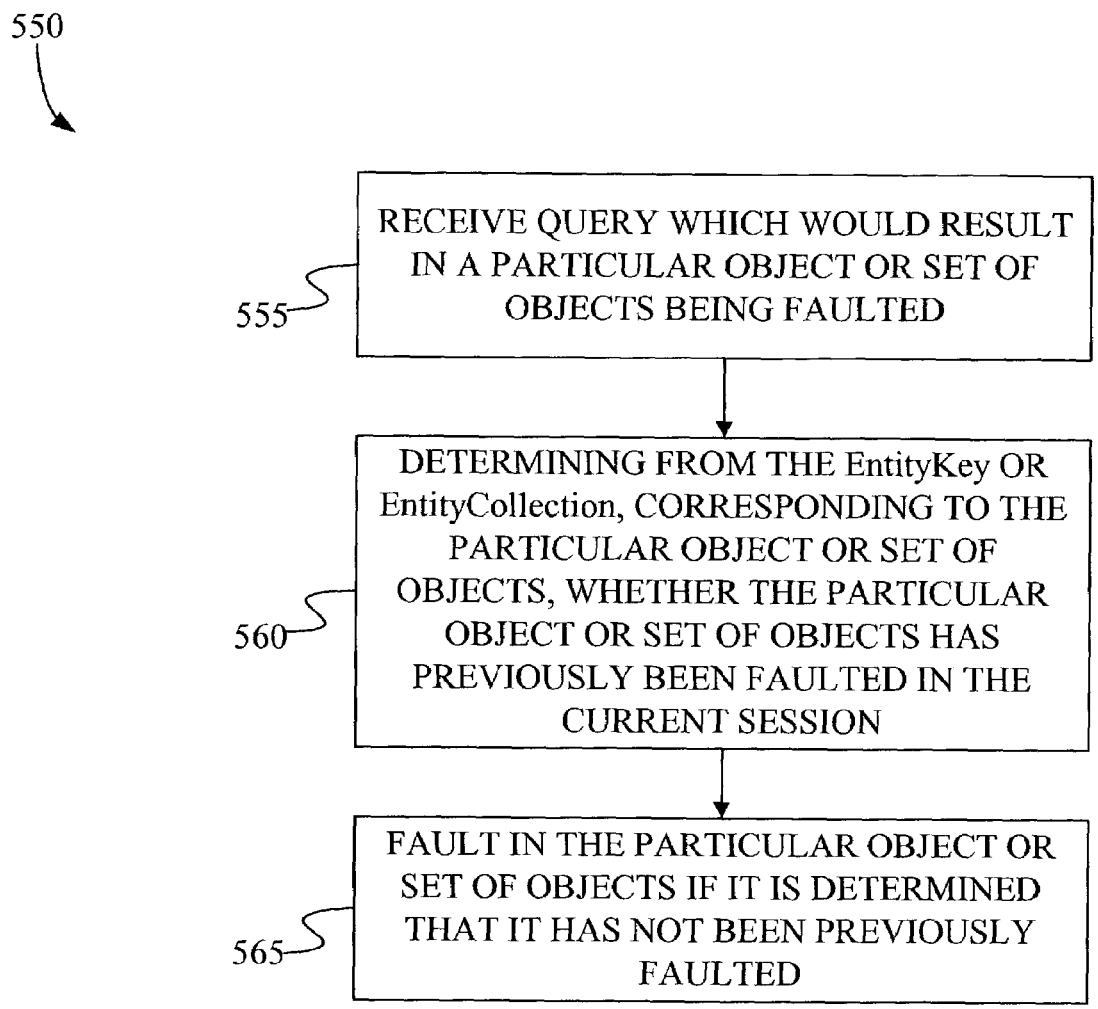
FIG. 11 is a flow diagram illustrating a method of preventing re-faulting of objects.

A method of preventing re-faulting of an object is illustrated in the flow diagram 550 shown in FIG. 11. First, as shown at 555, the method includes receiving a query which would result in a particular object being faulted. Then, as shown at 560, the method includes determining from the EntityKey (or EntityCollection) corresponding to the particular object (or sets of objects) to be faulted, whether the object has been previously faulted for the same object graph (i.e., in the current session). If the particular object to be faulted has not been previously faulted in the current session, then it is faulted. If it has been previously faulted, then it is not re-faulted. This is illustrated at 565 in FIG. 11.

Trimming an existing Graph

Recall that, for high performance, it is desirable to have specific non-essential objects or classes trimmed from a serialized graph. A serialized graph is a copy of a graph converted into a format (such as text or binary) that can be persisted to disk, cloned, transported across address spaces and machines or other similar purposes. The primary use of a serialized graph is that it can be de-serialized to create a copy of the original graph. Trimming a graph improves de-serialization performance because there are fewer objects to de-serialize. The present invention includes a method of trimming an existing graph to be serialized so as to improve efficiency.

Therefore, in accordance with another aspect of the invention, when serialization of an existing object graph occurs (or any mechanism where a copy of the graph is made), objects having association relationships to the root object are trimmed. For example, referring again to FIG. 10, say we have faulted in Customer class or object 510 in the Order graph (object graph in which the Order object 505 is the root object). Then, the Order graph can be serialized (for example into a Byte array) as follows:

Byte[ ]graphCopy=Serialize(order);

The graphcopy variable does not contain the serialized Customer class or object 510. Note, however, that graphcopy does contain the CustomerEntityKey 511 associated with the Customer class or object 510. The CustomerEntityKey 511 is serialized with the Order serialization because the Order object contains a reference to the CustomerEntityKey.

Figure 12:
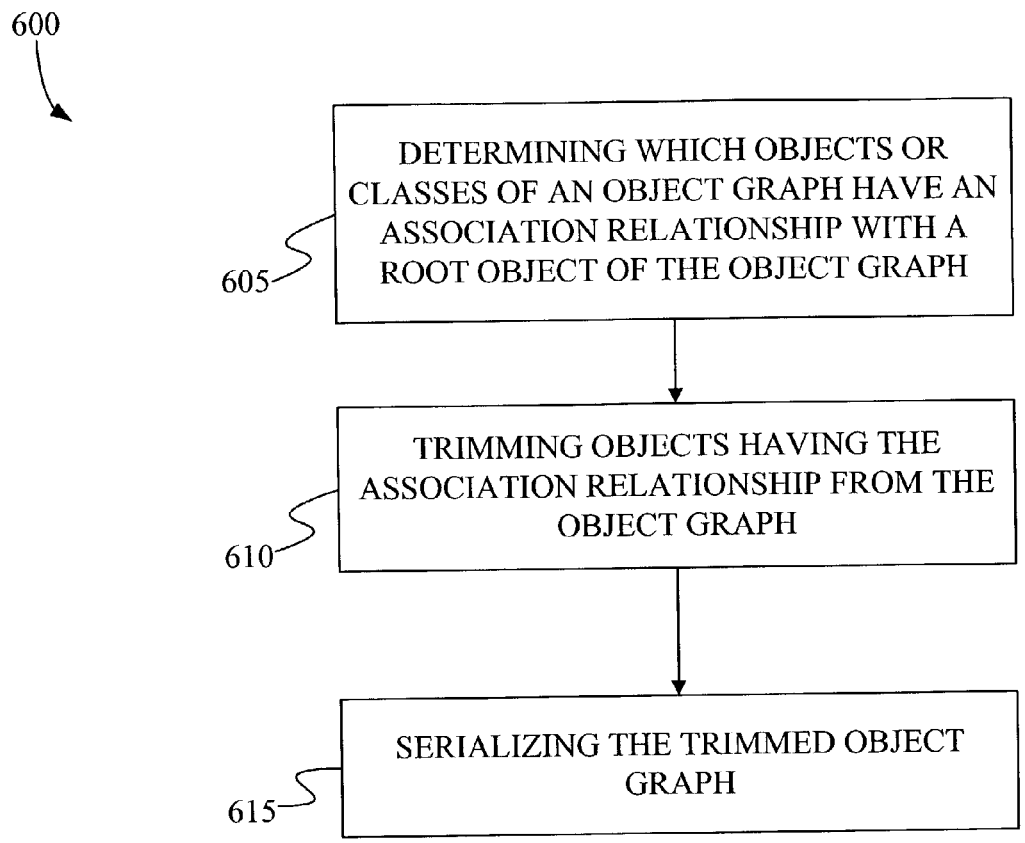
FIG. 12 is a flow diagram illustrating a method of trimming existing object graphs prior to serialization of the object graph.

Then, if we de-serialize the graph, for example as follows:

Order newOrder=Deserialize(graphCopy);

We now have a copy of the original Order object. Customer 510, even though it was already faulted in the original graph, will be faulted again in the new graph when the request for the Customer is made through the new copy of the Order:

cust=newOrder.CustomerKey.GetEntity( );

One embodiment of this method of trimming existing object graphs prior to serialization is illustrated in the flow diagram 600 shown in FIG. 12. As shown a step 605, the method includes the step of determining which objects or classes of objects in an object graph have an association relationship with the root object. This can be done as described above when determining which objects to eager load and which objects to fault for a new object graph. It can also be done by setting the Boolean "trim when serialized" variable 328 (shown in FIG. 4) to a value which will result in the system trimming or not trimming, as desired, a particular object prior to or during serialization.

In some embodiments, EntityCollections does not include a corresponding EntityKey boolean "trim when serialized" variable because, in these embodiments, EntityCollections are only used for compositions (and compositions are not trimmed). This also means that EntityCollections are not faulted very often in most common conditions. However, EntityCollection need not be limited to compositions, and in these embodiments, EntityCollection can include the variables and attributes which are the same or similar to those shown and discussed with reference to EntityKey. Also eager-loading can be turned off in some embodiments, which would result in EntityCollections being faulted.

Although the present invention has been described with reference to particular embodiments, workers skilled in the art will recognize that changes may be made in form and detail without departing from the spirit and scope of the invention.

What is claimed is:

1. A method for retrieving data in an object-relational database system, where data is stored on a computer storage device in one or more tables, the method comprising:
    receiving a query which results in a request to load a first object;
    identifying relationship types of other objects having a relationship with the first object;
    eager loading the first object and those of the other objects which have a first relationship with the first object; and
    marking those of the other objects which have a second relationship with the first object as fault on demand.

2. The method of claim 1 and further comprising:
    associating an entity key or an entity collection with each of the other objects, the entity key or entity collection having information pertaining to the relationship of the associated other object with the first object.

3. The method of claim 2, wherein the entity key or entity collection associated with each particular one of the other objects includes a reference attribute which maintains information indicative of whether the particular one of the other objects has previously been loaded in a current session, and upon receipt of a query which would result in a particular object or set of objects being faulted, the method further comprising:
    determining from the entity key or entity collection, corresponding to the particular object or set of objects, whether the particular object or set of objects has previously been loaded in the current session; and
    loading the particular object or set of objects if a determination is made that the particular object or set of objects has not previously been loaded in the current session.

4. The method of claim 1, wherein the first relationship is a composition relationship.

5. The method of claim 4, wherein the second relationship is an association relationship.

6. The method of claim 4, wherein an association relationship describes a dependency from an object to some other object.

7. The method of claim 4, wherein a composition relationship is a parent-child relationship in which a child object's lifetime is bounded by that of a corresponding parent object.

8. The method of claim 1, wherein eager loading the first object and those of the other objects which have the first relationship with the first object further comprises:
    retrieving an object graph as a result set in response to the query.

9. The method of claim 8, and further comprising:
    determining which objects or classes of an object have an association relationship with a root object of the object graph;
    trimming objects having the association relationship from the object graph; and serializing the trimmed object graph.

10. The method of claim 1, wherein the steps of identifying, eager loading and marking as fault on demand are recursively performed such that, for each particular object which was eager loaded along with the first object in response to the query, the method further comprises:
    identifying relationship types of other objects having a relationship with the particular eager loaded object;
    eager loading those of the other objects which have the first relationship with the particular eager loaded object; and
    marking those of the other objects which have the second relationship with the particular eager loaded object as fault on demand.

11. The method of claim 1, wherein marking those of the other objects which have the second relationship with the first object as fault on demand further comprises:
    initializing an entity key for each object marked as fault on demand.

12. The method of claim 1, and further comprising:
    eager loading with the first object those objects which a user has specified to be eager loaded.

13. The method of claim 12, and further comprising:
    marking as fault on demand those objects which have been specified by the user as fault on demand.

14. A data storage system, comprising:
    a relational data store component for storing data pertaining to objects in one or more tables; and
    a data access system configured to receive queries resulting in requests to load at least one object stored by the relational data store component, wherein in response to receipt of a query which results in a request to load a first object, the data access system being further configured to perform steps embodied in a tangible computer-readable medium, the steps comprising:
  identifying relationship types of other objects stored by the relational data store component having a relationship with the first object;
  eager loading the first object and those of the other objects which have a first relationship with the first object; and
  marking those of the other objects which have a second relationship with the first object as fault on demand.

15. The data storage system of claim 14, wherein the data access system is further configured to associate an entity key or an entity collection with each of the other objects, the entity key or entity collection having information pertaining to the relationship of the associated other object with the first object.

16. The data storage system of claim 15, wherein the first relationship is a composition relationship.

17. The data storage system of claim 16, wherein a composition relationship is a parent-child relationship in which a child object's lifetime is bounded by that of a corresponding parent object.

18. The data storage system of claim 17, wherein the second relationship is an association relationship.

19. The data storage system of claim 18, wherein an association relationship describes a dependency from an object to some other object.

20. The data storage system of claim 14, wherein the data access system is configured to recursively perform the steps of identifying, eager loading and marking as fault on demand such that, for each particular object which was eager loaded along with the first object in response to the query, the data access system is configured to perform the steps comprising:
  identifying relationship types of other objects having a relationship with the particular eager loaded object;
  eager loading those of the other objects which have the first relationship with the particular eager loaded object; and
  marking those of the other objects which have the second relationship with the particular eager loaded object as fault on demand.

21. The data storage system of claim 14, wherein the data access system is further configured to eager load with the first object those objects which a user has specified to be eager loaded.

22. The data storage system of claim 21, wherein the data access system is further configured to mark as fault on demand those objects which have been specified by the user as fault on demand.

* * * * *